R. G. McAULEY, DEC'D.
S. B. McAULEY, ADMINISTRATRIX.
TRAP.
APPLICATION FILED DEC. 15, 1911. RENEWED MAR. 29, 1913.
1,060,474.
Patented Apr. 29, 1913.
3 SHEETS—SHEET 1.
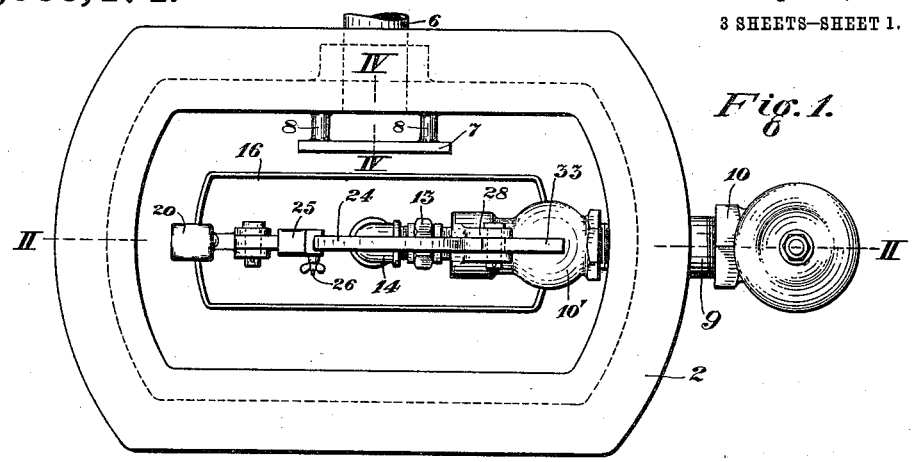
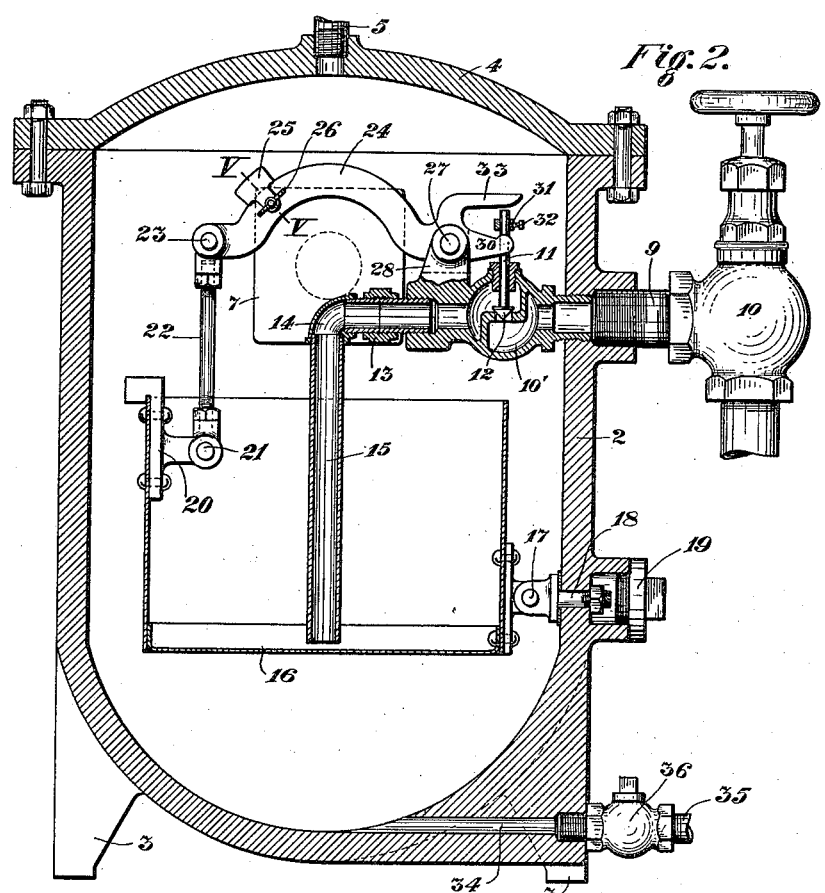
Witnesses:
Inventor:

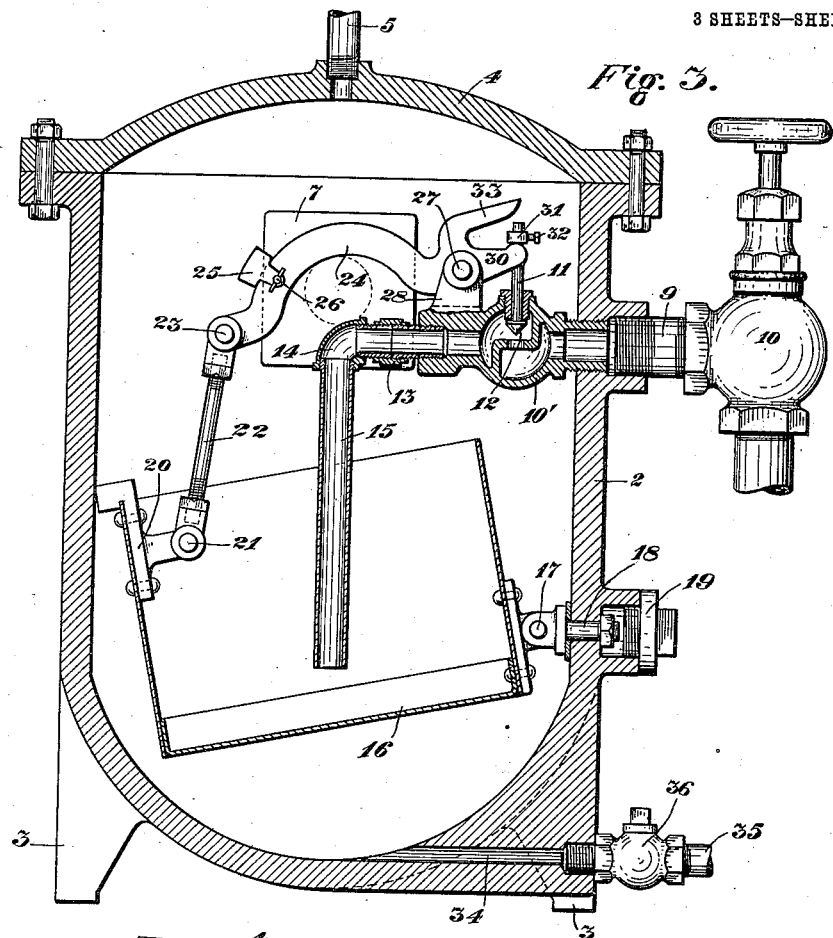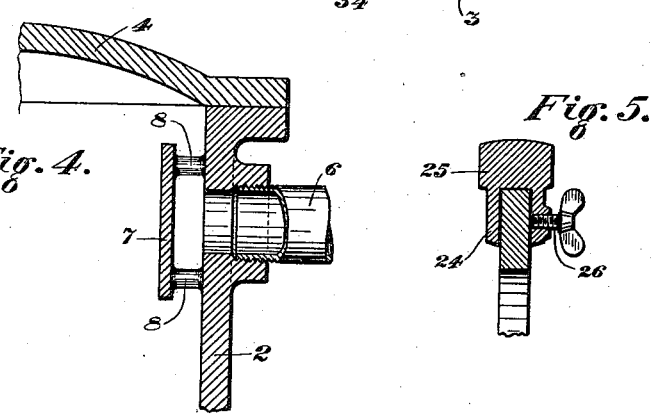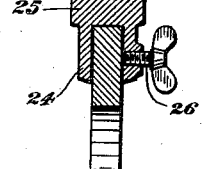

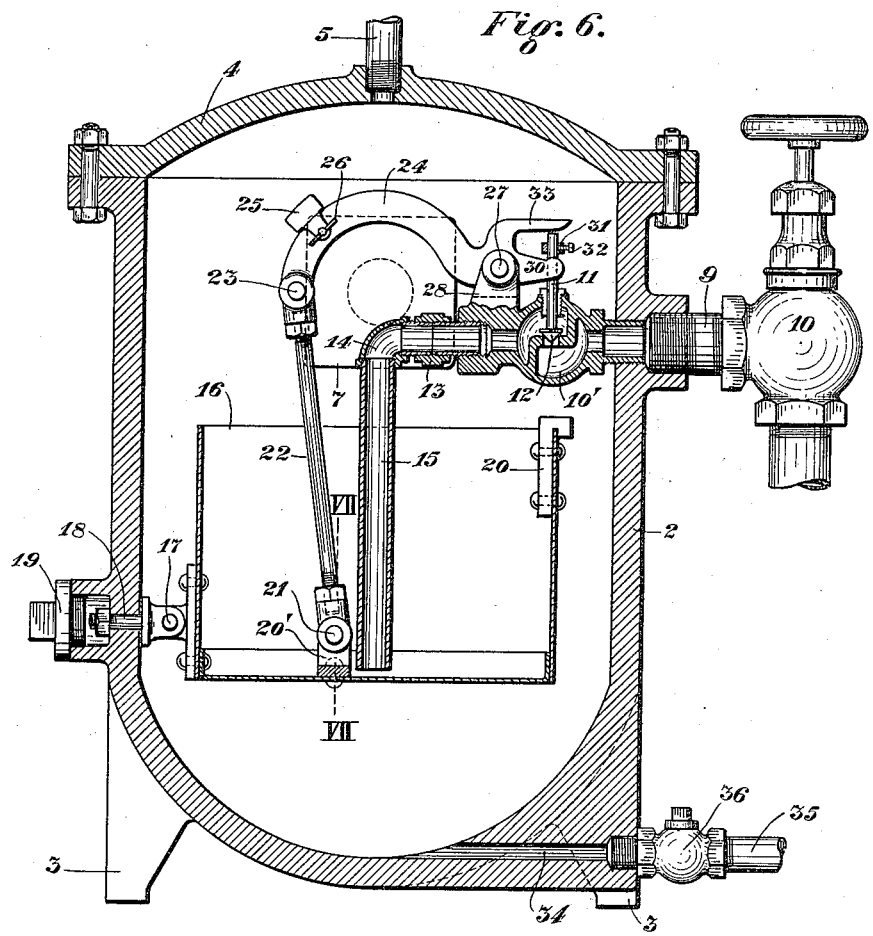
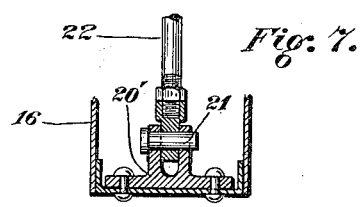

UNITED STATES PATENT OFFICE.

ROBERT G. McAULEY, OF PITTSBURGH, PENNSYLVANIA; SARAH B. McAULEY ADMINISTRATRIX OF SAID ROBERT G. McAULEY, DECEASED.

TRAP.

1,060,474. Specification of Letters Patent. Patented Apr. 29, 1913.

Application filed December 15, 1911, Serial No. 666,017. Renewed March 29, 1913. Serial No. 757,726.

*To all whom it may concern:*

Be it known that I, ROBERT G. McAULEY, a citizen of the United States, residing at Pittsburgh, in the county of Allegheny and State of Pennsylvania, have invented certain new and useful Improvements in Traps, of which the following is a specification.

My invention consists of an improvement in traps for collecting and disposing of water of condensation or other liquid accumulation. It is adapted to receive the liquid with a gravity actuated interior bucket, the operation of which depends upon the accumulation of the liquid within the outer casing together with valve and lever mechanism as shall be more fully hereinafter described.

The objects in view are to provide a trap of this type in which all of the working parts, of connections, etc., are in the interior of the outer casing, without any outside parts liable to breakage or derangement; a trap which will be positive and entirely automatic in its operation; prompt and effective, and not liable to get out of order or to require attention.

The invention is illustrated in the accompanying drawings in which—

Figure 1 is a plan view of the complete device. Fig. 2 is a vertical sectional view, indicated by the line II. II. of Fig. 1, showing the bucket erected. Fig. 3 is a similar view showing the bucket lowered for emptying. Fig. 4 is a sectional detail view, indicated by the line IV. IV. of Fig. 1. Fig. 5 is a sectional detail view indicated by the line V. V. of Fig. 2. Fig. 6 is a view similar to Fig. 2, showing a modified arrangement. Fig. 7 is a cross section on the line VII. VII. of Fig. 6.

In the drawings 2 is the main shell or casing of the trap provided with suitable supporting lugs or pedestals 3 for mounting it on any suitable base, the interior bottom being rounded, as shown, the casing being provided with a covering top 4. Said top is connected by pipe 5 to any suitable source of pressure, as air or gas, or may be plugged. Water of steam condensation, or fluid from any source is delivered to the interior of the vessel 2 by a pipe 6 introduced through the upper portion of the chamber wall, a suitable baffle-plate 7 being located inwardly in front of said connection by any suitable supporting means, as integrally cast stems 8. By this arrangement the water is discharged downwardly alongside the inner face of the casing, to its bottom.

It is designed that the accumulated contents of the casing shall be intermittently discharged from time to time through a pipe 9, introduced through the end wall of the vessel 2, preferably provided with a circulation controlling valve 10 in the line of said pipe 9. Connected with the outlet pipe at its inner side is a valve shell 10', fixedly screwed into the opening through the wall, as shown, said valve having a vertically movable stem 11, and an opening and closing terminal 12 adapted to control the circulation through the valve. Connected with the other end of the valve 10', preferably by a union 13 and a suitable elbow joint 14, is a pipe 15, extending downwardly into the interior of a tilting bucket 16. Said bucket, which is preferably made of sheet metal, as copper, is pivotally connected at 17 to the inner side of the vessel 2 by a pivotal mounting having a stem 18 extending through the wall and provided with a tightening nut, as shown, and preferably protected by a cap 19. It will be understood that any other suitable hinge connection may be substituted for that shown. At the other end of the bucket 16, at its upper portion is fixedly secured a lug 20 having a terminal bearing providing a pivotal joint 21. To said bearing 20 by such joint is connected the lower end of a connecting rod 22, the upper end of which is pivotally connected at 23 with the outer end of valve operating lever 24. Connecting rod 22 is preferably provided with adjustable pivotal bearings at each end, by means of right and left hand threads and lock nuts, whereby to vary its length and position of lever 24. Said lever is preferably provided with an adjustable counterweight 25 secured upon the lever by a set screw connection 26, whereby it may be shifted along and secured to the lever at any desired point. Lever 24 is pivotally mounted at 27 upon an upwardly extending bracket 28 forming a portion of the shell of valve 10', or it may be otherwise mounted as desired. Lever 24 is also provided with a short bifurcated terminal 30, the arms of which embrace the stem 11 of valve terminal 12, said stem having an adjustable collar 31 and a securing set screw 32, whereby to adjust the valve mechanism to the stroke of the lever. Lever 24 is also provided with a forwardly extending arm 33 projecting over the top of stem 11, and adapted to depress valve terminal 12 to its seat, when the bucket 16 is raised.

A drainage port 34 communicates with the bottom of the vessel 2 and with a discharge pipe 35 through an intervening cock or valve 36, whereby to discharge the contents of the vessel 2.

In Fig. 6, I show an alternative construction in which the construction is the same as above described, but in which the bucket 16 is pivotally mounted at the opposite side and the lever 24 is pivotally connected with the bottom of the bucket by a bearing connection 20′. By this arrangement the leverage of the bucket and its contents is increased, the lever connection being somewhat closer to the fulcrum, adapting the trap to successful use with very heavy or unusual pressures. The operation is the same as in the construction illustrated in the principal views.

The construction and action of the device will be readily understood from the foregoing description. As water accumulates in the interior of the vessel 2 around the bucket 16, its buoyant action will hold the bucket upwardly and the outlet valve closed until the water flows over the upper edge and into the interior of the bucket. Thereupon it will suddenly fall, due to the weight of its contents and any additional inrushing water, and will operate 24 to open valve closure 12 allowing the contents of the bucket to be forced upwardly by the internal pressure through pipe 15 and outwardly through the exhaust pipe 9. Bucket 16 being thus emptied, down to the level of lower end of pipe 15, will again rise to its normal position by the buoyancy of the water in vessel 2, operating to again close the outlet valve, when it is ready for another operation. These operations will continue at intervals dependent upon the rate of accumulation of the water within the vessel and the device will continue to operate in the manner intended as long as the water supply and internal pressure are maintained.

A feature of considerable advantage is in the large capacity of the trap within a very limited space. As shown in Fig. 1, the vessel is flattened at the sides providing a deep elongated chamber with ample capacity for the contents and for the tilting bucket. The leverage of the bucket and its action on the valve operating lever is thereby largely increased in a trap of any given capacity over a trap of the same cubical contents if made cylindrical.

It will be obvious that by temporarily closing the valve 10, the operation of the trap will be in no way impaired even though it be empty and with the bucket depressed as in Fig. 3. In such event it is merely necessary to retain the valve 10 closed until sufficient water has accumulated to float the bucket, whereupon valve 10′ will function and the circulation through valve 10 may be reëstablished.

The apparatus is comparatively simple in construction and very positive in its operation; compact and devoid of any external connections liable to derangement or breakage; and as a whole it will be found to perform its functions in a highly successful manner.

Having described my invention what I claim is:

1. A trap consisting of a case adapted to receive and contain fluid under pressure, a pivotally mounted vessel therein, an exhaust conductor leading outwardly from the case, a valve therefor, a pipe leading from said valve downwardly into the interior of the pivoted vessel, and an operating lever connected with the pivotally mounted vessel and having a bifurcated lifting terminal and a pressure finger in operative connection with said valve.

2. In a trap for intermittently discharging accumulations of liquid, the combination of a case, a supply pipe leading through the wall thereof, a buoyant vessel pivotally mounted within the case for tilting operation, an exhaust pipe extending downwardly into said vessel provided with a controlling valve having a stem and adapted to discharge the contents of the buoyant vessel outside of the case, and lever mechanism operatively connected with said valve and vessel and having a bifurcated lifting terminal and a pressure finger in operative engagement with said valve stem.

3. In a trap for intermittently discharging accumulations of liquid, the combination of a case, a supply pipe leading through the wall thereof, a buoyant vessel pivotally mounted within the case for tilting operation, an exhaust pipe extending downwardly into said vessel provided with a controlling valve having a stem and adapted to discharge the contents of the buoyant vessel outside of the case, and lever mechanism operatively connected with said vessel and provided with a counter-weight and a bifurcated lifting terminal and a pressure finger in operative engagement with said valve stem.

4. In a trap for intermittently discharging accumulations of liquid, the combination of a case, a supply pipe leading through the wall thereof, a baffle plate, a buoyant vessel pivotally mounted within the case for tilting operation, an exhaust pipe extending downwardly into said vessel provided with a controlling valve having a stem with an abutment thereon and adapted to discharge the contents of the buoyant vessel outside of the case, and lever mechanism operatively connected with said vessel and having a bifurcated lifting terminal in operative engagement with said stem and abutment and a pressure finger engaging the top of the stem.

5. In a trap for intermittently discharging accumulations of liquid, the combination of a case, a supply pipe leading through the wall thereof, a buoyant vessel pivotally mounted within the case for tilting operation, an exhaust pipe extending downwardly into said vessel provided with a controlling valve having a stem with an abutment thereon and adapted to discharge the contents of the buoyant vessel outside of the case, a lever pivoted on the valve case having a bifurcated arm adapted to engage the stem abutment to raise the stem of said valve and a pressure finger for lowering the valve at one side of its fulcrum, and means connecting the lever at the other side of its fulcrum with said vessel, substantially as set forth.

In testimony whereof I hereunto affix my signature in the presence of two witnesses.

ROBERT G. McAULEY.

Witnesses:
C. M. CLARKE,
FREDK. STAUB.

---

Copies of this patent may be obtained for five cents each, by addressing the "Commissioner of Patents, Washington, D. C."